(12) United States Patent
Hearn et al.

(10) Patent No.: US 9,616,514 B2
(45) Date of Patent: Apr. 11, 2017

(54) SYSTEM AND METHOD TO DETECT DROPLET DETACHMENT

(71) Applicant: LINCOLN GLOBAL, INC., City of Industry, CA (US)

(72) Inventors: James E. Hearn, Brunswick, OH (US); Steven R. Peters, Huntsburg, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 405 days.

(21) Appl. No.: 13/673,596

(22) Filed: Nov. 9, 2012

(65) Prior Publication Data

US 2014/0131320 A1 May 15, 2014

(51) Int. Cl.
*B23K 9/095* (2006.01)
*B23K 9/09* (2006.01)
*B23K 9/173* (2006.01)

(52) U.S. Cl.
CPC ............ *B23K 9/0953* (2013.01); *B23K 9/092* (2013.01); *B23K 9/173* (2013.01)

(58) Field of Classification Search
CPC .......... B23K 9/173; B23K 9/16; B23K 35/38; B23K 9/0953
See application file for complete search history.

(56) References Cited

U.S. PATENT DOCUMENTS

| | | | | |
|---|---|---|---|---|
| 5,834,732 A | * | 11/1998 | Innami et al. ............ | 219/130.51 |
| 6,025,573 A | * | 2/2000 | Stava ........................ | 219/130.21 |
| 7,304,269 B2 | * | 12/2007 | Fulmer et al. ............ | 219/130.51 |
| 7,598,474 B2 | * | 10/2009 | Hutchison et al. ....... | 219/130.21 |
| 8,063,340 B2 | * | 11/2011 | Hu ........................ | B23K 9/0953 |
| | | | | 219/130.21 |
| 8,153,933 B2 | * | 4/2012 | Yamazaki et al. ........ | 219/130.51 |
| 8,203,099 B2 | | 6/2012 | Peters et al. | |
| 8,723,080 B2 | * | 5/2014 | Kawamoto et al. ........ | 219/125.1 |
| 8,809,737 B2 | * | 8/2014 | Åberg ..................... | B23K 9/173 |
| | | | | 219/130.51 |
| 8,816,250 B2 | * | 8/2014 | Koshiishi et al. ........ | 219/130.51 |
| 8,901,454 B2 | * | 12/2014 | Nakagawa et al. ........ | 219/137 R |
| 2003/0222059 A1 | * | 12/2003 | De Kock ............... | B23K 9/042 |
| | | | | 219/121.63 |
| 2005/0051524 A1 | * | 3/2005 | Blankenship ........ | B23K 9/1062 |
| | | | | 219/130.51 |
| 2005/0269306 A1 | | 12/2005 | Fulmer et al. | |

(Continued)

FOREIGN PATENT DOCUMENTS

| | | |
|---|---|---|
| CA | 2815440 | 4/2012 |
| CN | 1931499 A | 3/2007 |

(Continued)

OTHER PUBLICATIONS

International Search Report and Written Opinion of the International Searching Authority dated Jun. 16, 2014.

*Primary Examiner* — Quang D Thanh
*Assistant Examiner* — Renee Larose
(74) *Attorney, Agent, or Firm* — Brad C. Spencer

(57) ABSTRACT

The invention described herein generally pertains to a method for improved droplet detachment detection in a welding process in which a derivative of at least one welding parameter over time is used to detect droplet detachment from the wire during a welding operation based identification of a peak signature.

18 Claims, 6 Drawing Sheets

(56) References Cited

U.S. PATENT DOCUMENTS

| | | | |
|---|---|---|---|
| 2006/0131291 A1* | 6/2006 | Kaufman | B23K 9/09 219/130.5 |
| 2007/0102409 A1* | 5/2007 | Koshiishi et al. | 219/130.51 |
| 2007/0210048 A1 | 9/2007 | Koshiishi et al. | |
| 2007/0221642 A1* | 9/2007 | Era | 219/130.21 |
| 2008/0237196 A1* | 10/2008 | Yamazaki et al. | 219/74 |
| 2008/0264923 A1* | 10/2008 | White | B23K 9/092 219/137 PS |
| 2009/0200281 A1* | 8/2009 | Hampton | 219/130.33 |
| 2009/0242532 A1* | 10/2009 | Huismann et al. | 219/130.1 |
| 2009/0242533 A1* | 10/2009 | Yamazaki et al. | 219/130.32 |
| 2010/0301030 A1* | 12/2010 | Zhang et al. | 219/130.1 |
| 2011/0114606 A1* | 5/2011 | Suzuki | 219/74 |
| 2011/0174784 A1* | 7/2011 | Kamei | 219/74 |

FOREIGN PATENT DOCUMENTS

| | | |
|---|---|---|
| JP | 2001 334365 A | 12/2001 |
| JP | 2001334365 | 12/2004 |

\* cited by examiner

SYSTEM AND METHOD TO DETECT DROPLET DETACHMENT

TECHNICAL FIELD

The invention described herein pertains generally to a method for improved droplet detachment detection in a welding process.

BACKGROUND OF THE INVENTION

Gas metal arc welding (GMAW), sometimes referred to by its subtypes metal inert gas (MIG) welding or metal active gas (MAG) welding, is a semi-automatic or automatic arc welding process in which a continuous and consumable wire electrode ("welding wire") and a shielding gas are fed through a welding gun.

Pulse spray metal transfer (GMAW-P) uses high energy of Axial Spray Metal Transfer and alternates this high energy (peak) current with a lower energy (background) current. Each cycle is referred to as a period and the period can repeat several hundred times per second. Spray or pulsed spray welding processes are free flight transfers in which a droplet formed detaches from the wire, crosses the plasma, and into the weld pool.

Pulsed energy produces desirable fusion characteristics and reduces the heat input considerably when compared to axial spray transfer or other welding processes. The dynamics of the pulse permit the use of GMAW-P for out-of-position welding. Therefore, it is easily seen that what is needed is a dynamic way to provide a more accurate method for detection of the droplet detaching (and the droplet detachment point) from a wire.

SUMMARY OF THE INVENTION

In accordance with the present invention, there is provided a process for detecting droplet detaching from a wire during a welding operation that uses a shielding gas comprising the steps of: providing a welding signal to a welding electrode in a succession of welding cycles during a welding process, each said welding cycle including a pulsed output comprised of a background output condition with a superimposed high output pulse condition during which the welding electrode heats up to a molten droplet and is pinched off and separates from the end of the electrode measuring at least one welding parameter during said welding process, calculating a derivative over time of said at least one welding parameter, detecting a peak signature within said derivative of at least one welding parameter during an arc of the welding operation, and reducing a magnitude of at least one welding parameter of said pulsed output used with said welding process based on said step of detecting. The at least one welding parameter is selected from the group consisting of current, voltage, resistance, and power. The process may further include the step of monitoring a duration of time from a start of the pulse to the termination of the pulse. The process may further include the steps of using the duration of time as a threshold value for a next cycle of the pulse; and terminating a next cycle of the pulse based on the step of using. The process may further include the step of using the duration of time as input for an adaptive control of the welding process for a next cycle. Moreover, process may further include the steps of using duration of time as an indicia of droplet size consistency and wire feed speed consistency between cycles of pulses.

In accordance with the present invention, there is provided a process for detecting droplet detaching from a wire during a welding operation that uses a shielding gas comprising the steps of: providing a welding signal to a welding electrode in a succession of welding cycles during a welding process, each said welding cycle a pulsed output comprised of a background output condition with a superimposed high output pulse condition during which the welding electrode heats up to a molten droplet and is pinched off and separates from the end of the electrode calculating a derivative over time of at least one characteristic selected from the group consisting of voltage, current, resistance, and power during said welding process, detecting a peak signature within said step of calculating during an arc of the welding operation, and modifying said pulsed output used with said welding process based on said step of detecting.

In accordance with the present invention, there is provided a process for detecting droplet detaching from a wire during a welding operation that uses a shielding gas comprising the steps of: providing a welding signal to a welding electrode in a succession of welding cycles during a welding process, each said welding cycle including a pulsed output comprised of a background output condition with a superimposed high output pulse condition during which the welding electrode heats up to a molten droplet and is pinched off and separates from the end of the electrode measuring at least one welding parameter during said pulse welding process, calculating a derivative over time of said at least one welding parameter, identifying a peak signature within said derivative over time of said at least one welding parameter during an arc of the welding operation, reducing a magnitude of at least one welding parameter of said pulsed output used with said pulse welding process based on said step of identifying, monitoring a duration of time from a start of said pulsed output to said reduction of magnitude of at least one welding parameter of said pulsed output, and using said duration of time as input for an adaptive control of said pulse welding process for a next cycle of said pulsed output.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
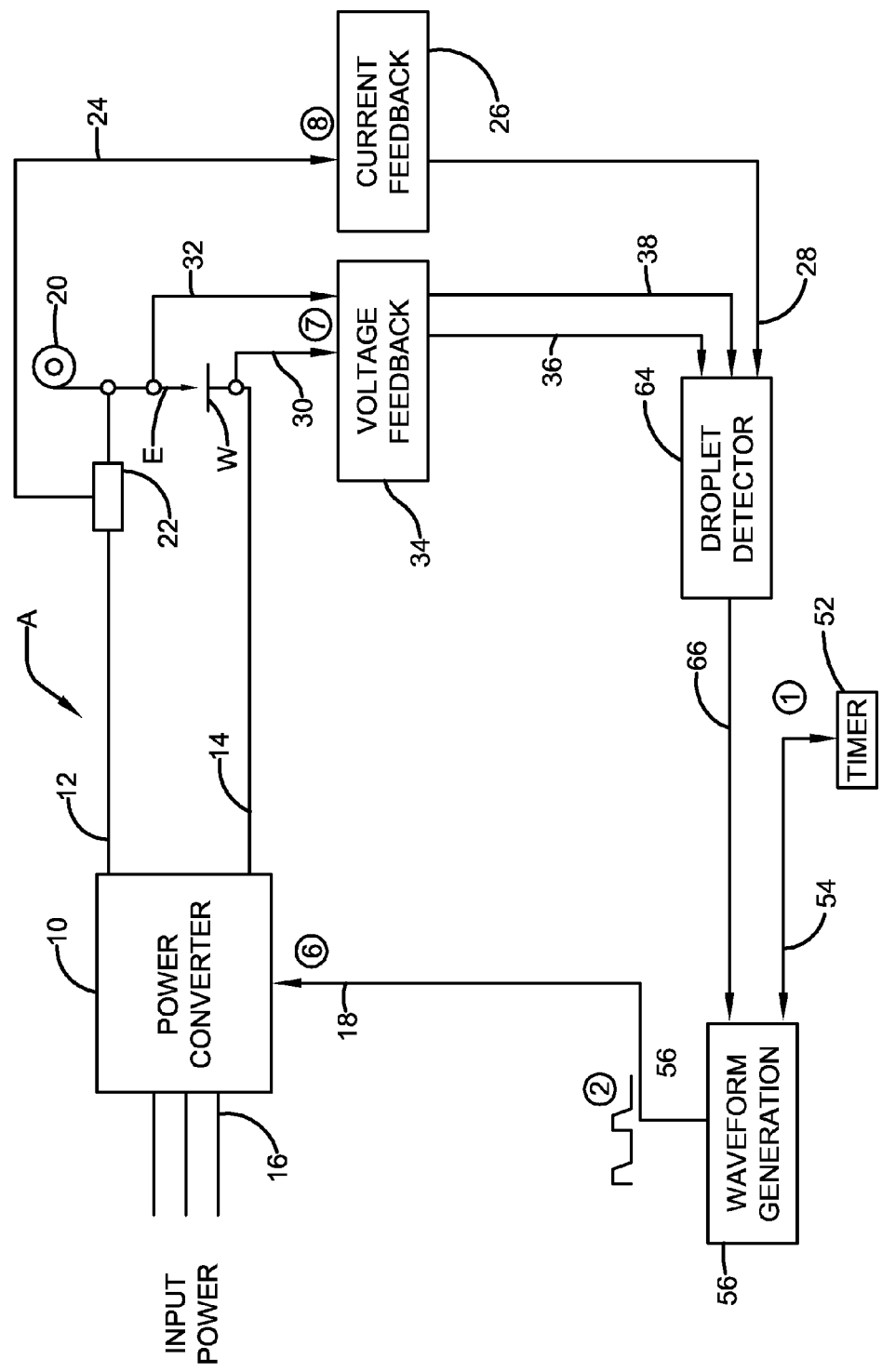
FIG. 1 is a combined block diagram and wiring diagram illustrating an electric arc welder for performing a pulse welding process employing a droplet detector circuit operating in real time to influence the waveform used on the welding event.
Figure 2:
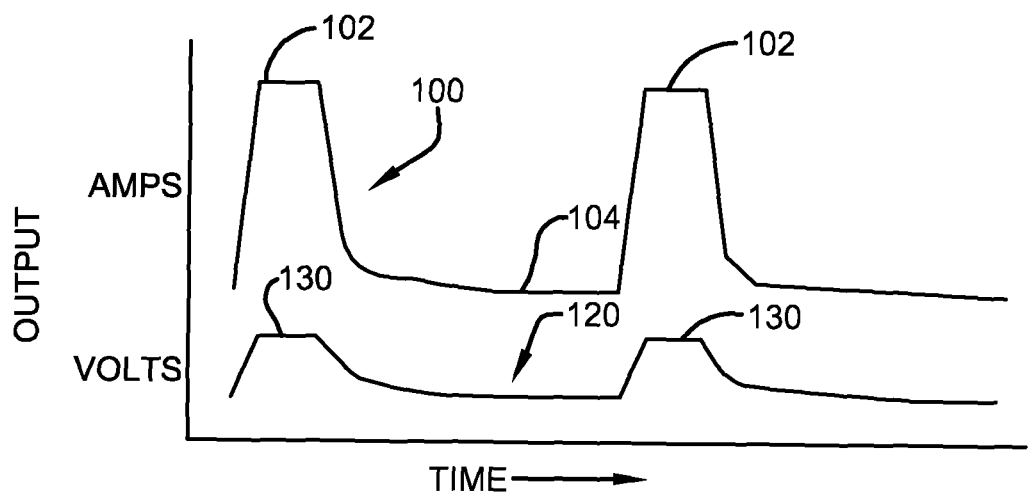
FIG. 2 is a graph illustrating a voltage curve and current curve of a prior art pulse welding process.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIG. 1 illustrates an electric arc welder A for performing an embodiment of a pulse welding process, as shown in FIG. 2. Although other welder architectures could be used, an exemplary architecture is a weld controlled by waveform technology as pioneered by The Lincoln Electric Company of Cleveland, Ohio. In this type of weld, a waveform generator produces the profile for the waveforms used in a pulse welding process. The power source creates the pulses in accordance with the shape determined from the waveform generator by using a plurality of current pulses and at high frequency such as over 18 kHZ. This type of technology produces precise pulse shapes for any desired welding process. Even though the invention will be described with respect to the use of a welder employing waveform technology, the invention is broader and may be used in other welders, such as SCR (Silicon Controlled Rectifier) controlled welds and chopper based welds A blip spike, peak, among others can be identified in a voltage trace where the droplet detached. Techniques attempt to use this blip, spike, peak, etc. as a droplet detection but the value related thereto constantly changed due to various factors such as, but not limited to, resistance drop, length of welding cables, among others. This application relates to a derivative detection technique in which a peak signature is used to detect detachment of the droplet. This technique is independent of factors such as, length of welding cables, resistance drop, among others.

As used in this application, the term "peak signature" 630 will mean a pre-defined signature, dynamically defined signature, and/or any suitable combination thereof (discussed below). Peak signature 630 is based upon a derivative of pre-defined characteristics such as, but not limited to, voltage, current, resistance, power, and the like. The physical manifestation of peak signature 630 can be influenced by: welding process used, electrode E composition, type of welding wire, wire feed rate, pulse width, pulse amplitude, number of pulses, duration of weld, material being welded, type of workpiece W, among others. Peak signature 630 can be a defined pattern or a characteristic (e.g., spike, peak, two or more spikes, two or more peaks, among others) detected in a waveform of a derivative of a welding parameter over time during the welding process, wherein the defined pattern can be based on at least one of a derivative of current reading, a derivative of voltage reading, a derivative of resistance reading, a derivative of power, among others. Moreover, peak signature 630 can be detected in real time from real time monitoring of a derivative of a welding parameter (e.g., voltage, current, resistance, power, among others). Alternatively, peak signature 630 can be identified in real time by identifying at least one defined pattern or characteristic such as, but not limited to, a spike (e.g., a positive spike, a negative spike, among others). In an example, droplet detector 64 detects droplet detection based on real time identification of peak signature 630 based on a threshold tolerance for the spike detected. The threshold tolerance can trigger detection of peak signature 630 and, in turn, initiate a reduction in the current to control droplet detachment from the wire. In an embodiment, peak signature 630 is used in pulsed spray transfer where the droplet is pinched off the end of the wire by a current pulse (e.g., pulsed output). During this detachment from the wire, the current has to change path from through the droplet to the end of the wire above the droplet which causes the arc length increases slightly. This slight increase can be detected and be referred to as peak signature 630.

Figure 3:
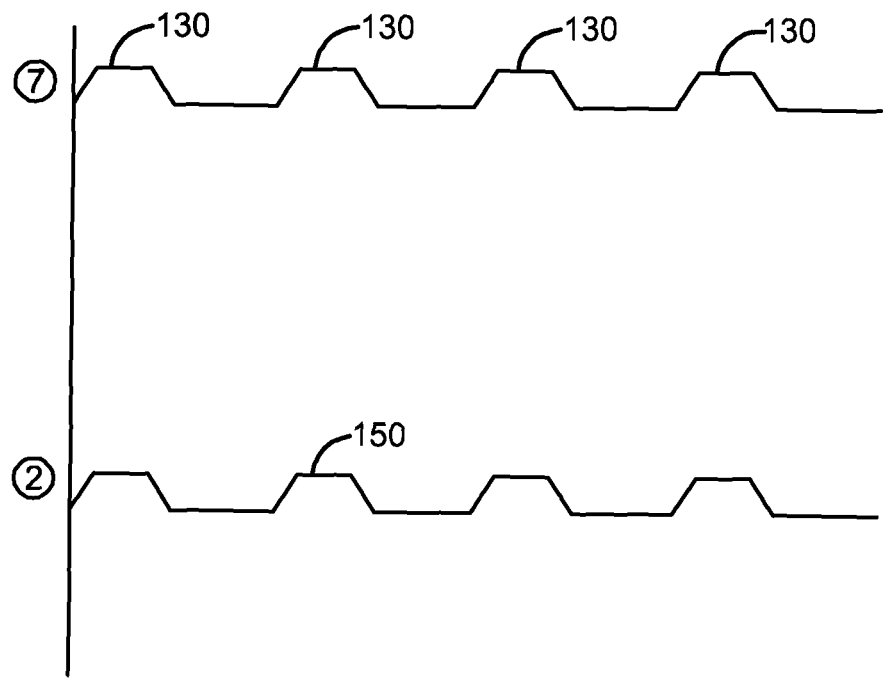
FIG. 3 is a graph illustrating the signals of various locations in the electric arc welder illustrated in FIG. 1.

Electric arc welder A shown in FIG. 1 is used to perform a standard pulse welding process as illustrated by the curves in FIG. 2 with a plurality of operating signals indicated at various locations in FIG. 1 and by corresponding numbers in FIG. 3. Electric arc welder A has a power source 10 in the form of a high speed switching inverter with output leads 12, 14 for creating the pulse welding process between electrode E and workpiece W. Power source 10 is driven by an appropriate power supply 16, illustrated as a three phase input. The profile of the pulses and background current constituting the pulse welding process is determined by a signal on wave shape input 18. The pulse welding process can include a pulsed output comprised of a background output condition or level with a superimposed high output pulse condition during with the welding electrode heats up to a molten droplet and is pinched off and separates from the end of the electrode E. Current shunt 22 communicates the arc current of the welding process by lines 24 to current sensor 26 having an output 28 used by droplet detector 64. In a like manner, leads 30, 32 communicate the arc voltage to voltage sensor 34 having detect output 36 and a level or amplitude output 38 used by droplet detector 64. Level output 38 has a signal representative of the arc voltage across the electrode and workpiece.

Electric arc welder A performs a pulse welding process in order to provide for controlled initiation of a transfer or release pulse (e.g., superimposed high output pulse) based on droplet detector 64 for each pulse welding cycle. In this regard, the invention is directed to pulse welding processes and equipment in which power source 10 applies a welding signal (via waveform in line 56 and/or wave shape input 18) to a consumable welding electrode E in a succession of welding cycles, each cycle having a melting condition during which molten metal forms at the end of electrode E as a result of welding current from power source 10, and a transfer condition in which a high current pulse (e.g., superimposed high output pulse condition) in the welding signal causes the molten metal to separate from electrode E before contacting workpiece W). The invention may be implemented in DC pulse welders as well as AC pulse welding applications, and is generally applicable to any type or form of welding equipment and to any pulse welding operation.

Electric arc welder A includes power source 10 and a wire feeder that operates to direct a consumable welding wire or electrode E from spool 20 toward workpiece W by operation of rollers, one or more of which are driven by a motor. Any type of welding wire or electrode E may be used, such as solid wire electrodes, cored electrodes having an inner core and an outer sheath (e.g., flux cored electrodes), among others. Electrode E passes through an electrical contact, where contact is coupled to an output of current shunt 22, wherein workpiece W is coupled to output lead 14. Power source 10 provides an output welding signal that generates welding current through electrode E and workpiece W in a plurality of welding cycles according to a pulse welding waveform provided by waveform generation 50, wherein a pulsed output comprised of a background output condition with a superimposed high output pulse condition during which the welding electrode E heats up to a molten droplet and is pinched off and separates from the end of the electrode E.

Waveform generator 50 is loaded with the particular waveform to perform the welding process. This waveform is indicated as signal 2. Timer 52 directs a timing signal by lines 54 to waveform generator 50 for the purpose of initiating the individual pulses constituting the welding process. Generator 50 also has a control signal from line 66 to control pulse generation in accordance with droplet detector 64. The waveform that is to be outputted by power source 10 is signal 2 in line 56. This signal, in welder A, is the actual signal directed to input 18 of power converter 10.

Figure 6:
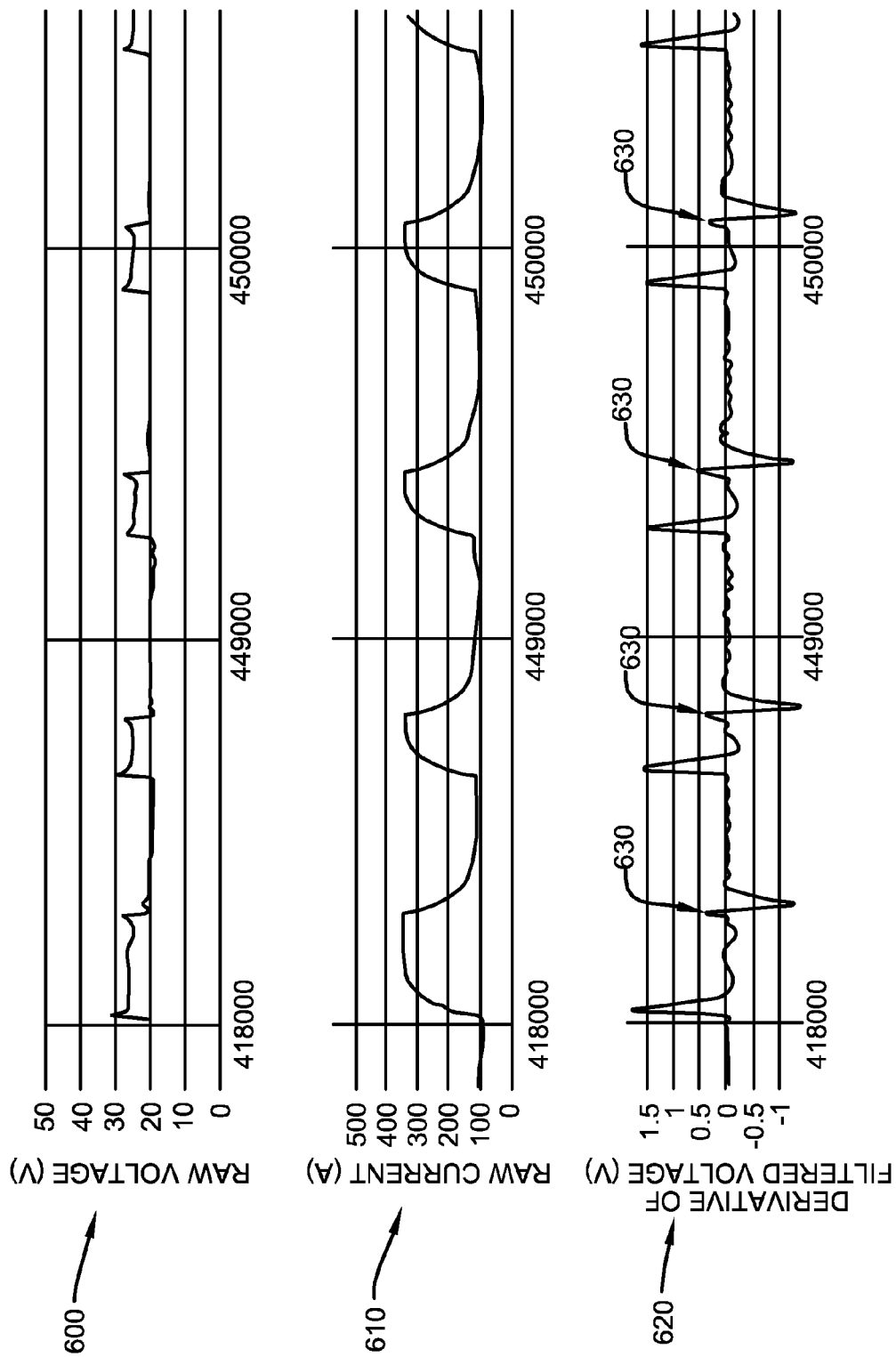
FIG. 6 is a group of waveforms depicting voltage vs. time, current vs. time, and derivative of voltage vs. time.

Droplet detector 64 identifies at least one condition representative of droplet detachment (and the droplet detachment point) from the wire using peak signature 630 as illustrated in FIG. 6. As discussed above, droplet detachment relates to a pulsed spray transfer where the droplet is pinched off the end of the wire by a current pulse. In an embodiment, peak signature 630 is used in pulsed spray transfer where the droplet is pinched off the end of the wire by a current pulse. During this detachment from the wire, the current has to change path from through the droplet to the end of the wire above the droplet which causes the arc length increases slightly. This slight increase can be detected and be referred to as peak signature 630. Droplet detector 64 calculates a derivative over time for a welding parameter to detect peak signature 630. The welding parameters, by way of example and not limitation, can be voltage of the welding process (e.g., detect output 36, level output 38, voltage level output, and the like), current of the welding process (e.g., output 28, arc current, and the like), resistance of the welding process (e.g., ascertained based on equation V=I*R, where V is voltage, I is current, and R is resistance), power of the welding process (e.g., ascertained based on equation P=I*V, where P is power, V is voltage, and I is current), among others. Based on detecting peak signature 630, i.e., the derivative over time of at least one welding parameter, droplet detector 64 modifies the pulse generation for the welding process via control signal 66 communicated to waveform generator 50. The modification of the current pulse during the welding process manages the droplet detachment (and the droplet detachment point) from the wire due to detection of peak signature 630. Although the waveform measured from the welding process is discussed as a pulse peak waveform, it is to be appreciated and understood any suitable waveform used in the pulse welding process is included within the scope of this invention.

Figure 5:
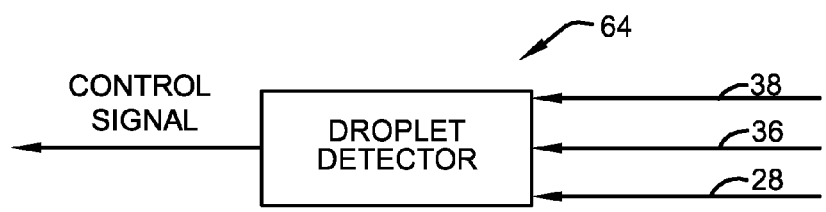
FIG. 5 is a combined block diagram and wiring diagram illustrating droplet detector for generating a control signal to influence the waveform used on the welding event.

Droplet detector 64 is illustrated in more detail in FIG. 5. Droplet detector 64 calculates the derivative over time for one or more welding parameters. As depicted, droplet detector 64 receives the welding parameters current (e.g., output 28) and voltage (e.g., detect output 36, level output 38). Although droplet detector 64 is depicted as receiving current and voltage parameters, it is to be appreciated and understood that droplet detector 64 can receive one or more welding parameters (e.g., current, voltage, resistance, and the like). Droplet detector 64 identifies peak signature 630 in real time which is used to detect droplet detachment (and the droplet detachment point) from the wire in the welding process. Peak signature 630 can be any suitable peak or spike such as, but not limited to, negative peak, positive peak, a negative spike, a positive spike, among others. Moreover, the appearance (e.g., magnitude, amplitude, width, polarity, and the like) of peak signature 630 can vary as well as correspond to a type of material used in the welding process. For instance, material A can have peak signature A' with a first appearance, whereas material B can have peak signature B' with a second appearance. However, peak signature 630 can include generalized characteristics (e.g., a spike, positive spike, negative, spike, and the like) that may be used to detect droplet detachment (and the droplet detachment point) from the wire for two or more type of materials used in the welding process.

Droplet detector 64 can use peak signature 630 as a default setting to trigger modification of the pulse generation for the current cycle of a welding process. The default setting for peak signature 630 can be pre-defined prior to a first cycle of a pulsed output for waveform generation based on a defined pattern or characteristic such as, a spike. In a more detailed example, peak signature 630 can be defined in a more particular manner including appearance details such as, but not limited to, amplitude, magnitude, width, polarity, and the like. Such particular appearance details can be identified through experimental data from pulse welding processes with similar conditions such as, but not limited to, a type of material for the welding process. Moreover, droplet detector 64 can include peak signature 630 as a dynamic setting. A dynamic setting enables for real time detection of peak signature 630 for each pulsed output of a welding process, wherein the peak signature 630 is identified from a derivative over time of one or more welding parameters. For example, a spike can be detected in real time upon monitoring a derivative over time of a welding parameter for a welding process which can signify a droplet detachment from the wire in a pulse spray transfer welding operation.

Droplet detector 64 detects peak signature 630 from a derivative of at least one welding parameter in real time. Upon dynamic detection of peak signature 630, control signal 66 is generated and communicated to at least modify a pulsed output in a cycle for the welding process. For example, the current for a pulsed output cycle can be rapidly reduced upon detection of peak signature 630. In another example, the pulsed output cycle can be modified by reducing power based on detection of peak signature 630. In one example, the pulsed output can be for an active (e.g., on-going) cycle. Ending the pulsed output for the active cycle manages the droplet detachment from the wire due to detection of peak signature 630. As mentioned above, droplet detector 64 detects droplet detachment based on identifying peak signature 630 within the derivative of at least one welding parameter over time. Although current and voltage are illustrated, it is to be understood that one or more welding parameters can be employed with this invention.

The welding process performed by welder A is illustrated in FIG. 2 wherein current curve 100 has a series of spaced current pulses 102 separated by background current portion 104. Voltage curve 120 is the voltage between lines 30, 32 and constitutes the arc voltage correlated with the arc current of curve 100. An active cycle designates a current pulse that is on-going whereas a next cycle references a current pulse that is subsequent the on-going current pulse. The peak in the dv/dt graph 600 indicates the droplet has been pinched off the end of the electrode toward the puddle. Droplet detector 64 detects peak signature 630 and sends a signal via control signal 66 to waveform generator 50 indicating the pulsed output in the active cycle is to be modified. The pulsed output in the active cycle can be modified by rapidly reducing current, rapidly reducing power, among others. Thus, waveform generator 50 manages the pulsed output for the active cycle based upon control signal 66. Waveform generator 50 generates a pulsed output for a next cycle after controlling the pulsed output of the active cycle.

The operation of welder A is disclosed by the signals 2 and 7 as shown in FIG. 3. Signal 7 is the sensed voltage in line 36. Under normal circumstances, voltage 120 includes a plurality of spaced pulses 130 having shapes determined by waveform generator 50 and spacing determined by timer 52. The output of waveform generator 50 is signal 2 constituting waveform signal 150 shown in FIG. 3. Waveform generator 50 initiates (e.g., starts) pulses for an active cycle of the welding process and terminates (e.g., ends) the pulsed output for the active cycle based on control signal 66 and, in turn, detection of peak signature 630 within readings related to a derivative of at least one chosen welding parameter over time. Thereafter the pulse has ended, waveform generator 50 generates a pulsed output for the next cycle of the pulse welding process.

Figure 4:
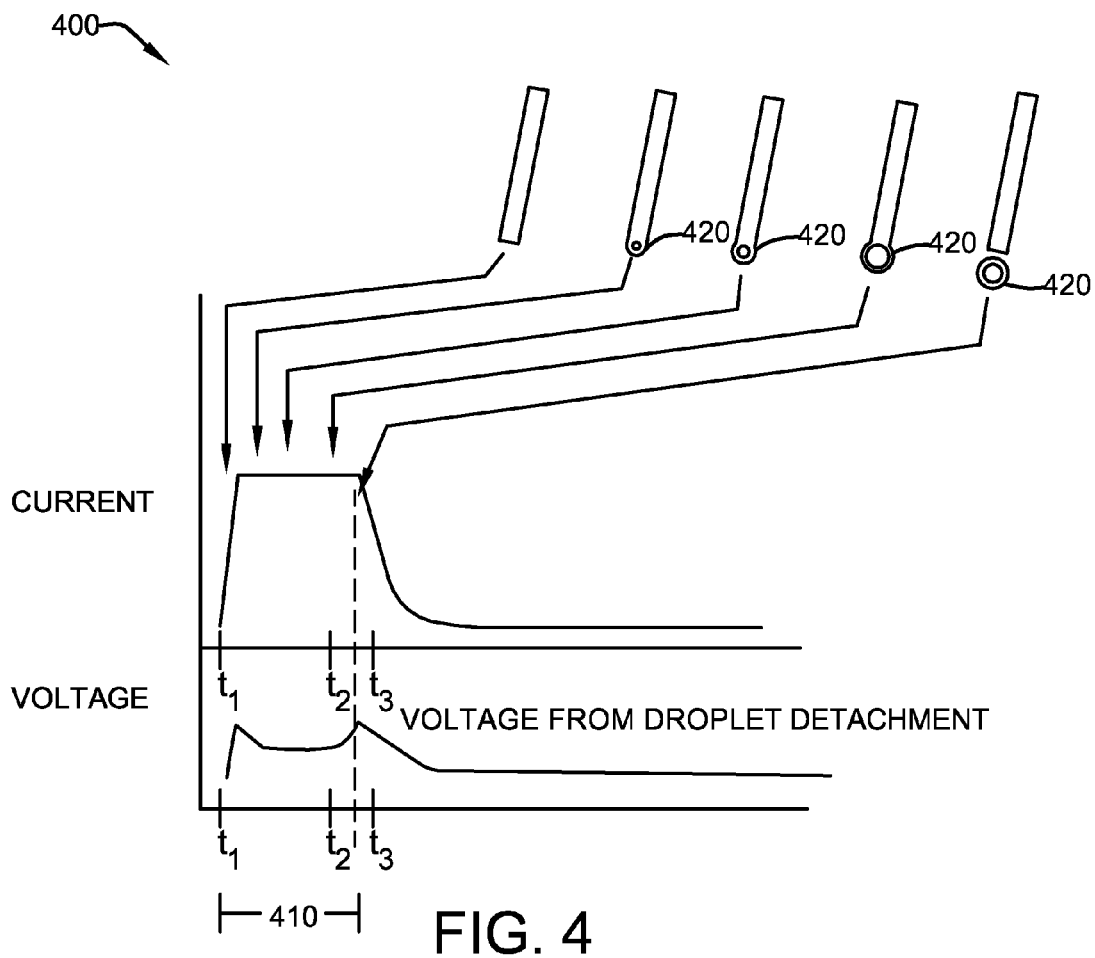
FIG. 4 is a waveform similar to FIG. 3 depicting current vs. time and associating it with weld bead formation, and ultimate droplet detachment from the wire.

Timer 52 monitors duration of time 410 (as seen in FIG. 4 and defined as an amount of time from $t_1$ to $t_t$) for the pulsed output from initiation (e.g., start) to termination (e.g., end), wherein termination is based on control signal 66. Duration of time 410 for the waveform is used as a threshold value for a next cycle of a pulsed output. Duration of time 410 can be used as the pulse width for the next cycle to accurately identify droplet detachment from the wire. Duration of time 410 is further used as an input for adaptive control of the welding process for a next cycle and/or future cycles for pulse(s). Additionally, duration of time 410 is used as an indicia of consistency of droplet size. For instance, dynamic monitoring of duration of time 410 for each waveform can indicate whether droplet size is consistent when duration of time 410 is not varying. However, varying duration of time 410 for each pulsed output can indicate inconsistent droplet size for the welding process. Furthermore, wire feed speed is detected during duration of time 410 for the pulse of an active cycle. At least one action is generated to correct a wire feed speed inconsistency based on the detected wire feed speed during duration of time 410. For instance, the detected wire feed speed for duration of time 410 for a pulsed output can be used for the next cycle of a pulsed output in order to reduce wire feed speed inconsistency.

FIG. 4, illustrates relationships between current, voltage, and molten drop development on welder tip. At time $t_1$, current is ramped to peak level and maintained essentially constant to time $t_2$. During time $t_1$ through $t_2$, molten drop 420 (e.g., also referred to as molten ball, ball, droplet, among others) is generated. At time $t_3$, molten drop 420 is transferring to the puddle. At a time between $t_2$ and $t_3$, a voltage spike occurs due to the droplet detachment (and the droplet detachment point) from the wire. The precise moment of droplet detachment (and related voltage spike) is somewhat unpredictable regardless of consistent parameters used in the welding process. However, droplet detector 64 detects the voltage spike (e.g., peak signature 630) in order to identify droplet detachment and starts the ramp down of current of the pulsed output for an active cycle to manage the pulse spray transfer welding operation.

FIG. 4 illustrates a single pulsed output associated with a welding process. Any suitable number of pulses can follow the single pulsed output and be a next cycle of a pulse. FIG. 6 illustrates voltage waveform 600, current waveform 610, and derivative voltage waveform 620. As mentioned, the waveform can be any suitable waveform (e.g., peak pulse waveform, among others) and include any suitable number of cycles of pulses. By way of example and not limitation, the waveforms illustrate four (4) complete pulses and one (1) incomplete pulse. In other words, the pulses in voltage waveform 500 are similar to the pulse in FIG. 4. Voltage waveform 500 depicts raw voltage over time illustrating pulses of various widths (e.g., corresponding to duration of time 410). Corresponding to each width of the pulse peak is raw current depicted in current waveform 510. Droplet detector 64 uses a derivative calculation over time on a selected welding parameter such as, but not limited to, a voltage, a current, a resistance, a power, or any suitable combination thereof. In this particular example, the derivative of voltage over time is depicted in waveform 520. Calculating the derivative of voltage over time allows a detection of peak signature 630 (e.g., a spike) in voltage occurring between time $t_2$ and $t_3$. At the point indicated by peak signature 630, peak signature 630 was detected thus ending the peak segment and the waveform logic progresses to reduce the current to the background amplitude. This peak signature 630 is indicative of droplet detachment (and the droplet detachment point). Peak signature 630 can be any suitable peak such as a positive peak, a negative peak, a positive spike, or a negative spike. Moreover, peak signature 630 can vary (e.g., size, amplitude, measurement, among others) in appearance based on type of material for the welding process. Although waveform 520 indicates a range for peak signature 630, it is to be appreciated and understood any suitable range for peak signature 630 is considered to be within the scope of this invention.

Furthermore, a peak pulse waveform is one of many waveforms that can be measured in real time in order to calculate a derivative of at least one welding parameter in the welding process and the subject application is applicable to any suitable waveform, waveform generator, and/or welding mode. Moreover, a pulse can vary dependent on a type of material used in the welding process. In other words, each type of material includes a particular pulse and/or waveform to shape such pulse in the welding process and, in turn, includes a particular peak signature 630.

By way of example and not limitation, the droplet detachment detection by droplet detector 64 can be employed with any suitable welding mode such as, but not limited to, pulse spray welding. Spray or pulsed spray welding is a free flight transfer in which a formed droplet detaches from the wire, crosses the plasma and into the weld pool. If the arc length is very short, the end of the electrode and the weld pool are very close, as the droplet is pinched off, the droplet can bridge the gap and short into the weld pool. This can produce a different signature in comparison to the dv/dt detected with peak signature. For example, spray or pulsed spray welding has a shorting condition (e.g., short into the weld pool when the arc length is short) and a non-shorting condition (e.g., target condition for the welding process). Moreover, a pulse spray metal transfer welding mode includes the use of a shielding gas. The pulsed waveform for a pulse spray metal transfer can be broken into several components in which an increase to a component for a given waveform can increase energy and subsequent penetration. A ramp-up rate can allow the molten droplet to form at the end of the electrode, wherein increases to the ramp-up rate stiffen the arc while decreases soften the arc. An increase to an overshoot can overcome the influence of inductance which can vary with cable length. Another component can be peak current which can be responsible for weld penetration. Increased peak current increases penetration while a decrease in peak current reduces penetration. A peak time is another component in which a longer peak time can result in a wider bead shape. A tail-out can add energy to the molten droplet. An increase to tail-out time can increase penetration while a decrease in tail-out time can reduce penetration. A tail-out speed can add energy to the molten droplet. An increase to puddle fluidity permits a fast follow molten puddle. A stepoff can reduce the tendency for fine droplet spatter. A background current can be a component in which a low-level current can maintain the arc, whereas a superimposed high current output can transfer the droplet from the wire/electrode. An increase in frequency can narrow the arc cone whereas a decrease in frequency can broaden the arc cone.

Peak signature 630 can be used to indicate and detect separation of a droplet from the end of a wire and/or to start a change or modification of a welding parameter (e.g., start a ramp down of a current routine). Surface Tension Transfer (STT) welding uses a dv/dt technique to indicate a separation of a droplet from the end of a wire as well. However, spray or pulsed spray welding uses peak signature 630 while there is an arc. On the contrary, STT used dv/dt to detect when a short circuit is about to break into an arc. Within STT it is critical to identify a period before the short broke so the current can be adjusted (e.g., reduced) quickly to prevent an explosive transition from a short to an arc. The detection in STT happened during the short circuit condition (e.g., before an arc). Peak signature 630 is used with spray or pulsed spray welding while there is an arc. Although a short circuiting condition may occur (e.g., droplet bridges the gap) and logic is used during such short circuit condition (e.g., a short clearing routine), peak signature 630 is not used in such a short circuit condition in spray or pulsed spray welding processes. If there is not a short circuiting condition, peak signature 630 is used to detect droplet detachment from the wire. Peak signature 630 is detected during a high output peak condition within the welding process. Peak signature 630 is not a predictive tool but rather indicates when the droplet has detached from the wire. Once peak signature 630 is detected, there is no need to pull the output down quickly to prevent spatter during the transition from a short to an arc since the welding process is already in an arc (e.g., peak signature is detected and used while in an arc). In an example, a time (e.g., 0 to 3 milliseconds) that can be paused before reducing current. The ramp down can be consistent with regards to the exact time the droplet transfers based on the use of peak signature 630.

Figure 7:
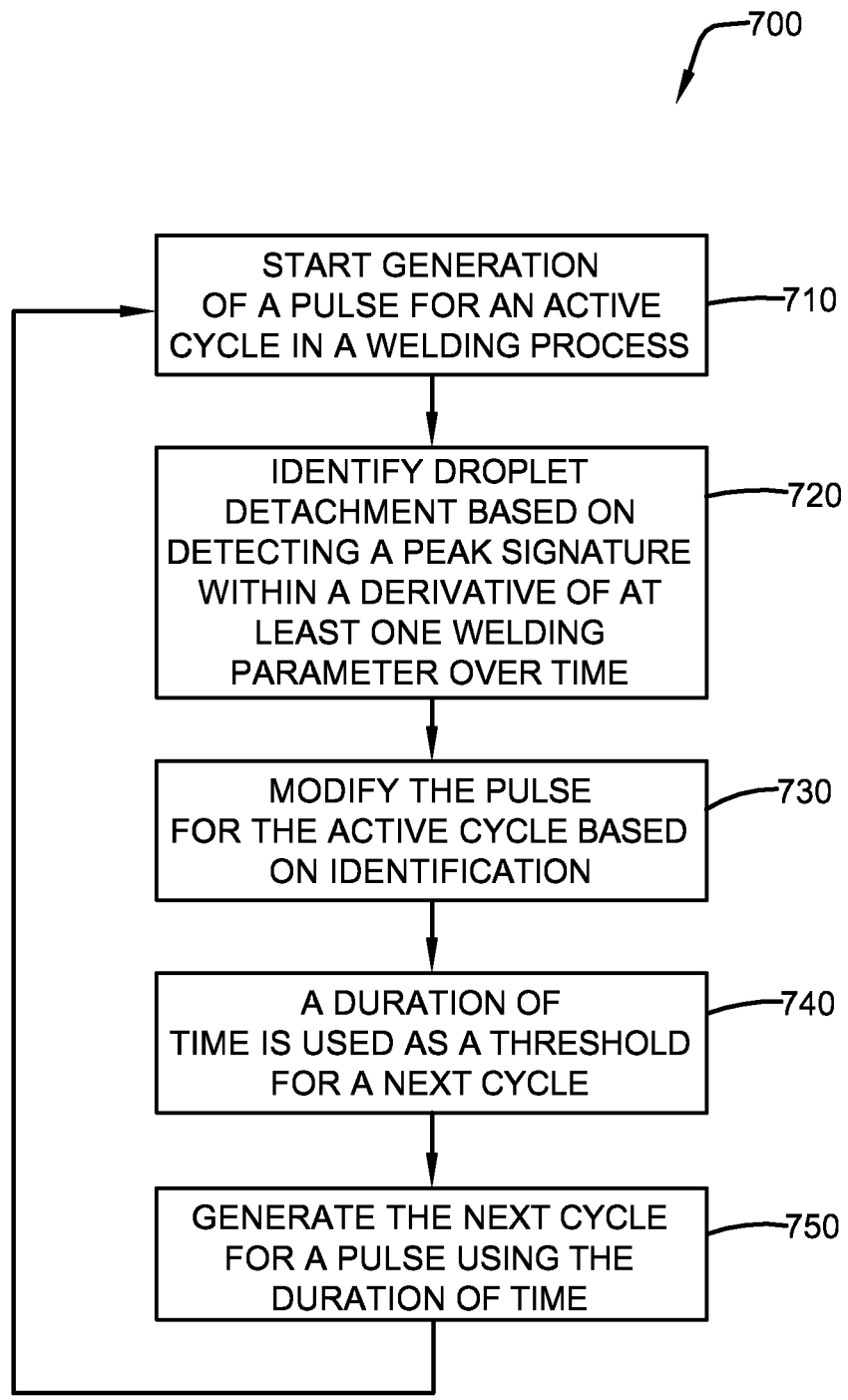
FIG. 7 is a flow diagram of the controlling a pulsed output and identifying a threshold to employ in the next cycle of the pulsed output.

Sequentially, the following occurs as illustrated in the decision tree flow diagram 700 of FIG. 7. Generation of pulsed output for an active cycle in a welding process can start (e.g., initiate) (reference block 710). Based on detecting a peak signature within a derivative of at least one selected welding parameter, droplet detachment from the wire is identified (reference block 720). Based on the identification, the pulsed output for the active cycle is modified (reference block 730). A duration of time from the start of the pulsed output to the modification of the pulsed output is used as a threshold value for a next cycle (reference block 740). The next cycle for a pulsed output is generated using the duration of time (e.g., waveform width) (reference block 750).

Figure 8:
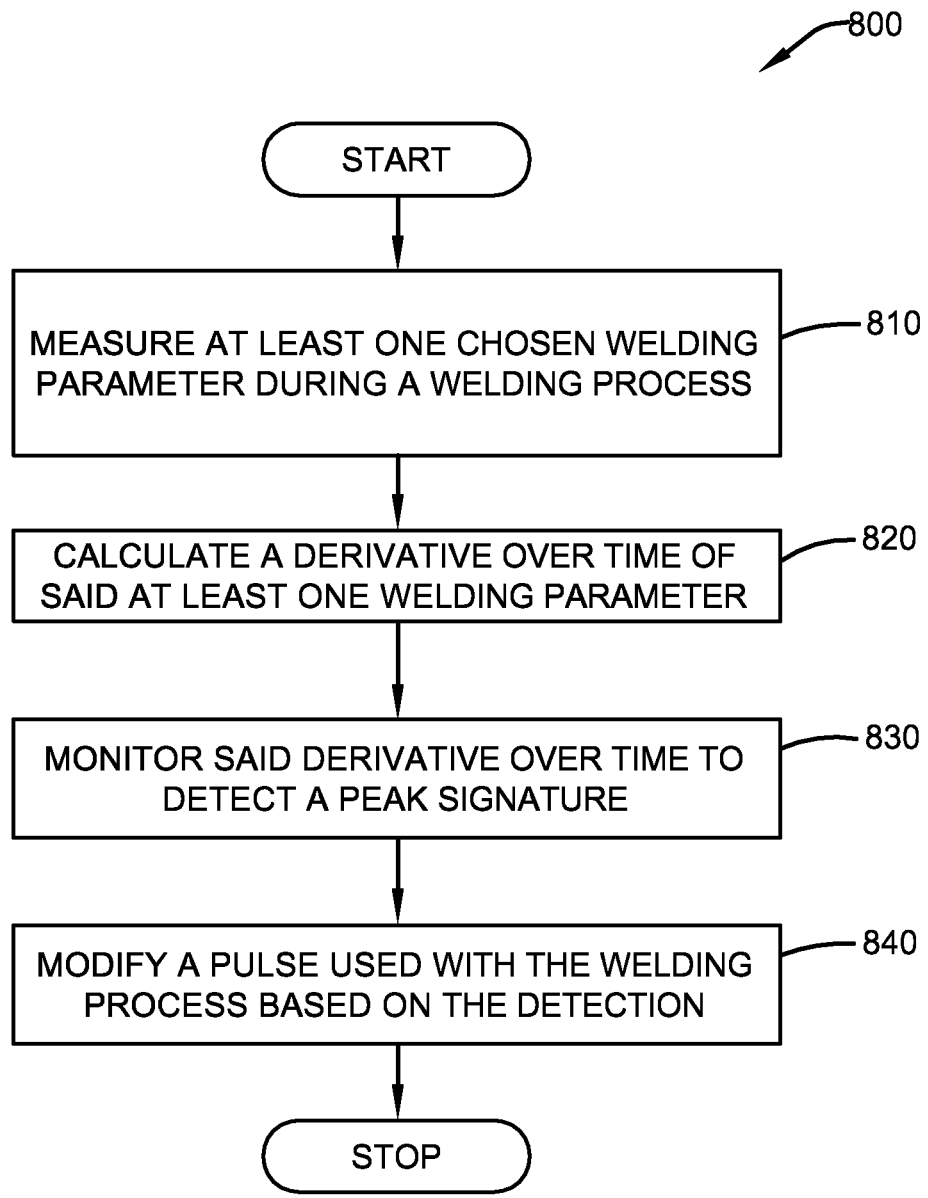
FIG. 8 is a flow diagram of the termination of a pulsed output based on detecting a peak signature in real time.

The following occurs as illustrated in the flow diagram 800 of FIG. 8. At least one chosen welding parameter during a welding process is measured (reference block 810). A derivative over time of said at least one selected welding parameter is calculated (reference block 820). The derivative of said at least one welding parameter is monitored to detect a peak signature (reference block 830). A pulsed output used with the welding process is modified based on detecting the peak signature (reference block 840).

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process for detecting detachment of a droplet from a wire during a welding operation that uses a shielding gas comprising the steps of:
   providing a welding signal to a welding electrode in a succession of welding cycles during a spray or pulsed spray welding process, each said welding cycle including a pulsed output comprised of a background output condition with a superimposed high output pulse condition during which the welding electrode heats up to a molten droplet and is pinched off and separates from the end of the electrode;
   measuring at least one welding parameter during said welding process to determine a start time for the measurement of the at least one welding parameter;
   calculating a derivative over time of said at least one welding parameter;
   during said high output pulse condition, identifying droplet detachment from the wire by detecting a peak signature in the absence of a short circuit condition within said derivative of at least one welding parameter during an arc of the welding operation to determine an end time for the measurement of the at least one welding parameter, a difference between the start time and end time being a time duration; and
   returning to said background output condition by reducing a magnitude of at least one welding parameter of said pulsed output used with said welding process based on said step of detecting the peak signature within said derivative, and using the time duration to modify a subsequent welding cycle.

2. The process of claim 1 wherein
   said at least one welding parameter is selected from the group consisting of current, voltage, resistance, and power.

3. The process of claim 1 wherein
   said peak signature is a positive peak or a negative peak.

4. The process of claim 1 wherein
   said peak signature is based on a type of material used in the welding process.

5. The process of claim 1 which further comprises the step of
   applying said time duration as a threshold value for a next cycle of said pulse.

6. The process of claim 5 which further comprises the step of
   terminating a next cycle of said pulse based on said step of applying, and wherein said time duration is a threshold value for said next cycle of said pulse.

7. The process of claim 1 which further comprises the step of
   applying said time duration as input for an adaptive control of the welding process for a next cycle.

8. The process of claim 1 which further comprises the step of
applying said time duration as an indicia of consistency of a droplet size.

9. The process of claim 1 which further comprises the step of detecting a
wire feed speed during said duration of time.

10. The process of claim 9 which further comprises
the step of generating at least one action to correct a wire feed speed inconsistency based upon said step of detecting.

11. The process of claim 9 wherein
said action applies said wire feed speed for a next cycle of said pulse.

12. The process of claim 1 which further comprises the step of
modifying said welding signal in said welding process based on said step of reducing.

13. A process for detecting droplet detachment and a droplet detachment point from a wire during a welding operation that uses a shielding gas comprising the steps of:
providing a welding signal to a welding electrode in a succession of welding cycles during a spray or pulsed spray welding process, each said welding cycle a pulsed output comprised of a background output condition with a superimposed high output pulse condition during which the welding electrode heats up to a molten droplet and is pinched off and separates from the end of the electrode;
measuring at least one welding parameter associated with the welding signal to determine a start time for the measurement of the at least one welding parameter;
calculating a derivative over time of the at least one welding parameter associated with the welding signal selected from the group consisting of voltage, current, resistance, and power during said welding process;
during said high output pulse condition, identifying droplet detachment from the wire by detecting a peak signature in the absence of a short circuit condition within said step of calculating during an arc of the welding operation to determine an end time for the measurement of the at least one welding parameter, a difference between the start time and the end time being a time duration;
returning to said background output condition based on detecting the peak signature in the derivative; and
modifying said pulsed output used with said welding process based on said step of detecting the time duration.

14. The process of claim 13 which further comprises the steps of
using said time duration as a threshold value for a next cycle of said pulse; and
terminating said next cycle of said pulse based on said detecting the peak signature.

15. The process of claim 13 which further comprises the steps of detecting
a wire feed speed during said time duration; and using said wire feed speed for a next cycle to correct a wire feed speed inconsistency.

16. The process of claim 13 which further comprises the step of
changing at least one parameter of said welding signal in said welding process based on said step of modifying.

17. A process for detecting droplet detachment and a droplet detachment point from a wire during a welding operation that uses a shielding gas comprising the steps of:
providing a welding signal to a welding electrode in a succession of welding cycles during a spray or pulsed spray welding process, each said welding cycle including a pulsed output comprised of a background output condition with a superimposed high output pulse condition during which the welding electrode heats up to a molten droplet and is pinched off and separates from the end of the electrode;
measuring at least one welding parameter during an arc of said pulse welding process;
calculating a derivative over time of said at least one welding parameter;
during said high output pulse condition, identifying droplet detachment from the wire by identifying a peak signature time in the absence of a short circuit condition within said derivative over time of said at least one welding parameter during an arc of the welding operation to determine an end time for a cycle;
returning to said background output condition by reducing a magnitude of at least one welding parameter of said pulsed output used with said pulse welding process based on said step of identifying the peak signature within said derivative;
monitoring a duration of time from a start of said pulsed output to said end time; and
using said duration of time as input for an adaptive control of said pulse welding process for a next cycle of said pulsed output.

18. The process of claim 17 wherein
said at least one welding parameter is selected from the group consisting of current, voltage, resistance, and power.

* * * * *